April 25, 1961  J. A. SMYSER  2,980,950
TIRE CHUCK
Filed Aug. 18, 1958  2 Sheets-Sheet 1
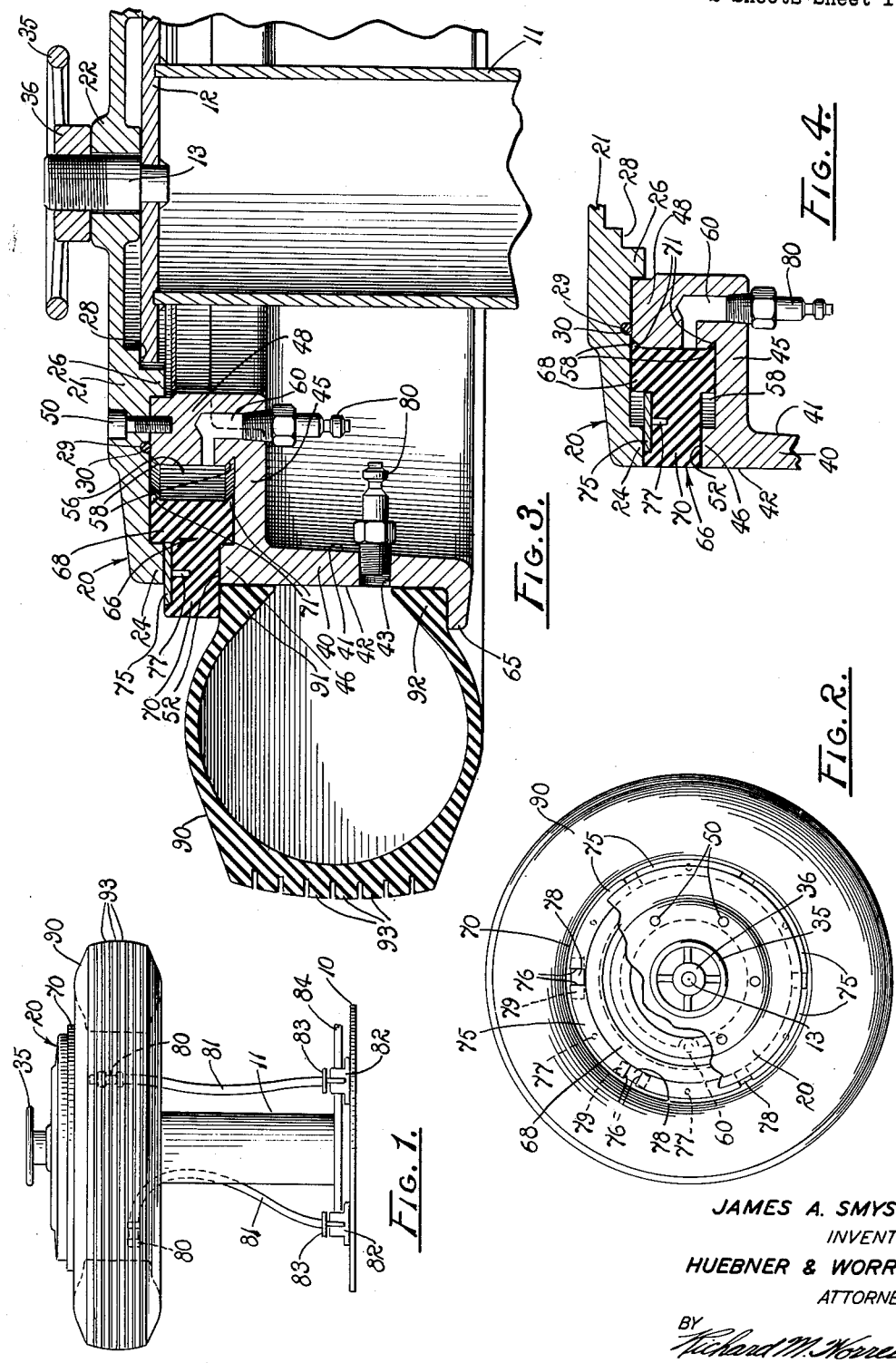
JAMES A. SMYSER
INVENTOR
HUEBNER & WORREL
ATTORNEYS
BY April 25, 1961    J. A. SMYSER    2,980,950
TIRE CHUCK Filed Aug. 18, 1958    2 Sheets-Sheet 2

JAMES A. SMYSER
INVENTOR
HUEBNER & WORREL
ATTORNEYS
BY 2,980,950
TIRE CHUCK
James A. Smyser, 207 Harrison St., Kern, Calif.
Filed Aug. 18, 1958, Ser. No. 755,466
11 Claims. (Cl. 18—2)

The present invention relates to a tire chuck and more particularly to a rim for releasably quickly mounting a tubeless tire in circumscribing relation thereon and for enabling inflation of the tire when so mounted.

There are many situations in which it is desirable quickly to mount a tubeless tire in a predetermined position and to inflate the tire in such position. For example, when nylon cord tires are manufactured, they are normally quite distorted when taken from the molds. They are preferably inflated during cooling so as to attain the desired shape. This procedure, known in the trade as "post-inflation," is performed immediately after the tire is taken out of the mold and while the residual heat in the tire and the cord is sufficient to permit proper shaping.

Conventionally, it has been the practice to insert an expansible rubber tube into the tubeless tire, to mount the tire and tube on a chuck provided for the purpose, and to inflate the tube to attain the desired tire shape for cooling. This procedure has been cumbersome, time consuming, and inefficient. The tubes are difficult to insert into the tires when the tires are hot. In many instances, it has been difficult to subject the tire to the desired internal pressure until it had lost more of its residual heat than desired. The various steps of the procedure have involved excessive labor resulting in higher costs for the tires. Even though these problems have long been recognized in the industry, they have been tolerated in the absence of any better procedure for shaping such tires.

Accordingly, it is an object of the present invention to provide a tire chuck adapted expeditiously to mount and release tires thereon.

Another object is to provide such a chuck adapted to receive and to inflate tubeless tires.

Another object is to provide an apparatus for post-inflating tires subsequent to their removal from their molds, on which tires can conveniently be mounted, readily inflated, and easily removed.

Another object is to minimize the time and inconvenience conventionally associated with mounting and inflating a tubeless tire.

Another object is to minimize damage to the annular beads on a tubeless tire during mounting of such a tire on a chuck and removal of the tire from the chuck.

Another object is to provide a rim of the nature described which effects an air-tight seal with a tire mounted thereon so as to facilitate inflation of the tire.

Another object is to provide an apparatus of the type described which is economical, simple, and dependable in operation.

These, together with other objects, will become more fully apparent upon reference to the following description and accompanying drawings.

In the drawings:

Fig. 1 is a side elevation of a tire mounting apparatus embodying the principles of the present invention and illustrating a tire mounted on the apparatus.

Fig. 2 is a top plan view of the apparatus and tire of Fig. 1 with a portion of the apparatus broken away to show internal construction thereof.

Fig. 3 is a somewhat enlarged fragmentary vertical section taken through the apparatus of Figs. 1 and 2 and showing the tire mounting apparatus in a condition in which the tire mounted thereon is in air-tight engagement with the apparatus and adapted for inflation.

Fig. 4 is a fragmentary vertical section of a portion of the apparatus in condition for receiving or releasing a tire.

Figure 5:
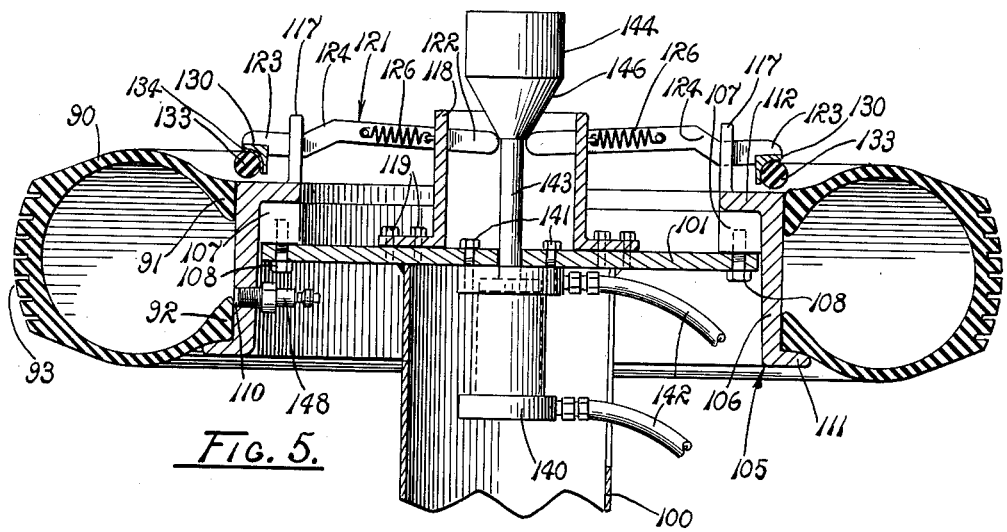
Fig. 5 is a view similar to Fig. 3 but showing another form of tire mounting apparatus embodying the principles of the present invention with the apparatus shown in a position wherein a tire can be mounted on or removed from the apparatus.

Referring more particularly to the drawings, a base 10 is illustrated in Fig. 1, and a column 11 is mounted on the base and preferably upwardly extended therefrom so as to have a vertical axis. A mounting plate 12 is secured, as by welding, to the upper end of the column in a horizontal position and radially outwardly extended therefrom. A stud 13 has a lower end, secured as by welding, concentrically of the plate and an upper threaded end portion above the plate.

A tire mounting rim or chuck 20 includes a generally circular upper cover plate 21 having a central hub 22 providing a bore fitted over the threaded end portion of the stud 13 and rested on the mounting plate 12. The cover plate has an upper outer annular downwardly extended rib 24, an inner annular downwardly extended rib 26 in radially inwardly substantially parallel spaced relation to the outer rib, and a substantially horizontal annular shoulder 28 extended radially inwardly from the inner rib. An annular downwardly opening recess 29 is provided between the ribs, and a resiliently flexible and compressible O-ring 30 of circular cross-section is fitted in the recess.

The cover plate 21 is releasably adjustably clamped on the mounting plate 12 by means of a hand wheel 35 providing a hub 36 screw-threaded on the stud 13 and engageable with the hub 22 of the cover plate.

The rim 20 also provides an upright annular outer wall 40 in circumscribing substantially concentric relation to the column 11 and providing an inner surface 41, an outer surface 42, and an air passage 43 extended between said surfaces. A radial web 45 is inwardly extended from the inner surface of the outer wall annularly of the column thereby providing a lower outer rib 46, and an inner annular wall 48 is upwardly extended from the web in spaced substantially parallel relation to the outer wall. The inner wall is fitted upwardly between the ribs 24 and 26 of the cover plate 21 and against the inner rib. Bolts 50 are extended downwardly through the cover plate into the inner wall for supporting the inner wall, the radial web, and the outer wall on the cover plate and thus on the column 11. As mounted, the outer rib 24 is actually an upward extension of the outer wall but with the upper outer rib 24 in vertically upwardly spaced relation to the lower outer rib 46 and defining an annular slot 52 therebetween in circumscribing relation to the column.

Further, the cover plate 21, outer wall 40, the web 45, and the inner wall 48 define an annular air chamber 56 in communication with the slot 52. The inner wall 48 provides upper and lower beveled edges 58 outwardly convergently extended, and also an air passageway 60 establishing communication between the interior and the exterior of the chamber. The inner wall engages the underside of the cover plate 21 in covering relation to the recess 29 therein and thus in engagement with the O-ring 30. O-ring provides an air-tight seal between the mating surfaces of the cover plate and the inner wall.

An annular receiving flange 65 is integrally rigidly radially outwardly extended from the outer wall 40 adjacent to its lower edge. The subject invention also provides an upper diametrically expansible continuous annular mounting flange 66 of elastic, resiliently flexible and compressible material, such as rubber, having an inner head portion 68 fitted in the chamber 56 in engagement with the cover plate 21 and the web 45, and a tongue portion 70 radially outwardly extended from the head portion through the slot 52 having a lower surface in engagement with the lower outer rib 46. The head portion has rearwardly disposed upper and lower inwardly divergently extended beveled edges 71 adapted for complementary engagement with the beveled edges 58 on the inner annular wall 48.

A plurality of arcuate segment plates 75, of steel or other rigid preferably metallic material, provide opposite ends 76 and are individually secured to the mounting flange 66 by means of pins 77 connected to the plates and embedded in the tongue portion 70. The segment plates are in circumscribing relation to the column 11 with their adjacent ends in circumferentially spaced relation, as best seen in Fig. 2. The plates have upper surfaces in slidable engagement with the upper outer rib 24. The elastic mounting flange is adapted for diametric expansion from an inner relatively relaxed position, as illustrated in Fig. 4, with the head portion 68 fitted against the inner wall 48 and the tongue portion 70 retracted inwardly of the slot 52, to an outer diametrically enlarged, expanded position with the head portion 68 abutting the outer ribs 24 and 46 and with the tongue portion 70 radially outwardly extended from the outer wall 40 in opposed substantially parallel spaced relation to the receiving flange 65, as best seen in Fig. 3. The mounting flange is in air-tight engagement with the outer wall and the radial web so as to preclude leakage of air out of the chamber between the mating surfaces of the mounting flange, outer wall web, and cover plate.

It will be apparent that the plates 75 are segmented to accommodate expansion of the flange 66. Thus, as the flange expands, the ends 76 of the plates draw apart. Although the resultant maximum spacing is not great, arcuate bridge plates 78 are preferably positioned in overlapping relation to the ends 76 and provide reinforcement for the tongue portions 70 when expanded. In order to insure that the bridge plates do not work from proper bridging position, each is preferably secured at one of its ends to an adjacent segment plate, as by spot welding at 79. The opposite end of each slide plate slidably engages an adjacent end of its opposite engaged segment plate 75.

The mounting flange 66 is adapted for movement from its described inner position to the outwardly expanded position incident to application of force radially applied outwardly thereagainst within the chamber 56. For this purpose, a valve stem 80 is screw-threaded into the air passageway 60. A similar valve stem 80 is also screw-threaded in the air passage 43. Hoses 81 are individually connected to the valve stems, downwardly extended therefrom, and individually connetced to lower values 82 mounted on the base 10 and providing foot controls 83. A common supply conduit 84 is connected to the valves 82 and has an opposite end, not shown, connected to a source of air under pressure, also not shown. By opening the valves by means of their separate foot controls, air is admitted to the chamber and/or outwardly through the air passage 43. Although forming no particular part of the present invention, means are provided for bleeding the air from the hoses 81 through the valves 82 and to the atmosphere.

Operation

The operation of the described embodiment of the subject invention is believed to be readily apparent and is briefly summarized at this point. In summarizing the operation of the described invention, reference is made to a tubeless tire 90 having a pair of spaced annular beads 91 and 92 and treads 93.

Assuming that the tire 90 has just been recapped, and it is desired to subject the tire to post-inflation to facilitate shaping of the tire during hardening, utilization of the subject mounting apparatus will be described. Initially, the mounting flange 66 is in its retracted, relatively relaxed position, with the tongue portion 70 withdrawn into the slot 52, as illustrated in Fig. 4. The tire is then fitted downwardly over the cover plate 21 and placed in circumscribing relation on the outer wall 40 with the beads 91 and 92 engaging the outer surface 42 of the outer wall and with the lowermost bead rested on the receiving flange 65. In this position, the uppermost bead 91 is slightly below the lower outer rib 46.

Thereupon, the foot valve control 83 associated with the valve stem 80 connected to the chamber 56 is actuated to admit air into the chamber. This expands the upper mounting flange 66 to extend the tongue portion 70 into its outer position, as viewed in Fig. 3. It will be evident that the tongue portion is in marginally overlapping relation to and in air-tight engagement with the lower outer rib 46 and the uppermost bead 91. The segment plates maintain the generally circular form of the flange during expansion and contraction thereof, facilitate sliding of the flange in and out of the slot 52, and act as bearings to minimize wear on the upper surface of the mounting flange.

The foot control 83 associated with the valve stem 80 connected to the air passage 43 is then actuated to admit air into the tire for inflation thereof. It will be evident that air pressure within the tire urges the beads 91 and 92 outwardly against the lower receiving flange 65 and the upper mounting flange 66. The leveraging of the beads by the air pressure against their respective flanges further increases the air-tight seals between these members. With the tire thus mounted and inflated, it is allowed to cool and harden in desired shape and distortion of the recapping treads is minimized.

When it is desired to remove the tire 90, air is bled from the hoses 81 to deflate the tire and retract the mounting flange 66. The tire is then simply lifted upwardly off from the rim 20. It will thus be evident that the described rim enables the rapid mounting of a tire thereon and removal of a tire therefrom and does not necessitate wedging, jamming, pounding, or the like, against the beads 91 and 92 whereby damage to the beads and the likelihood of subsequent air leaks is avoided. At the same time the tire is mounted in air-tight engagement on the rim for ease of inflation. The rim is made of separate parts for enabling insertion of the mounting flanges 66 in the chamber 56 and for repair or replacement of the mounting flange. Thus, the outer wall 40, radial web 45 and the inner wall 48 are easily separated from the cover plate 21 by removing the bolts 50. The rim is, of course, easily separated from the column 11 by unthreading the wheel 35.

Second form

The second form of the subject invention embodies the same principle of operation as the first form of the invention described above but provides a somewhat different structure. An upright column 100 is fragmentarily illustrated in Figs. 5 and 6, and a mounting plate 101 is secured to the upper end of the column, all as before.

A rim 105 includes an outer annular wall 106 in circumscribing concentric relation to the column 100 and supported on the mounting plate 101 by means of blocks 107 secured to the wall, and bolts 108 upwardly extended through the mounting plate and into the blocks. The annular wall has an air passage 110 radially extended therethrough between its inner and outer surfaces. A lower receiving flange 111 is integrally radially outwardly extended from the wall, and an upper mounting web 112 is integrally radially inwardly extended from the wall in spaced substantially parallel relation to the lower flange.

Figure 6:
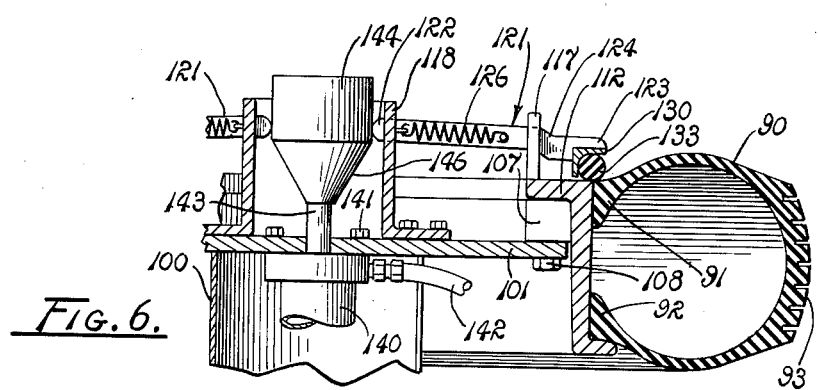
Fig. 6 is a fragmentary view similar to Fig. 5 but showing the apparatus in a condition for inflation of the tire.

A plurality of outer guide posts 117 are rigidly upwardly extended from the web 112 in circumferentially spaced relation around the web. An inner guide ring 118 is mounted on the plate 101 by means of bolts 119 and is upwardly extended in radially inwardly spaced relation to the outer guide posts. The inner guide rings and the outer guide posts provide generally radially aligned eyelets, and elongated arms 121 are individually radially slidably extended through the eyelets. Each of the arms has an inner end portion 122 adjacent to the axis of the column 100, an outer end portion 123 extended over the web 122, and an intermediate offset portion 124 joining the inner and outer end portions. As best seen in Figs. 5 and 6, the inner end portions of the arms are disposed upwardly in substantially parallel relation to the outer end portions of their respective arms. Tension springs 126 individually connect the arms to the inner guide ring for yieldably urging the arms radially inwardly in the eyelets.

Figure 7:
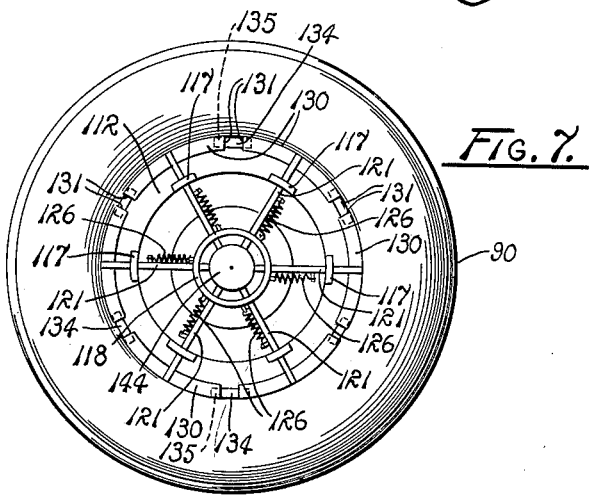
Fig. 7 is a top plan view of the form of the invention shown in Figs. 5 and 6 although somewhat reduced in scale.

A plurality of rigid arcuate plates 130 of angular cross section and having opposite ends 131 are rigidly connected to the outer end portions 123 of the arms 121 and form a diametrically expansible annulus in circumscribing relation to the axis of the column and with their adjacent ends in circumferentially spaced relation, as best seen in Fig. 7, and in a manner similar to that described in connection with the segment plates 75. Thus mounted, the plates 130 are generally outwardly and downwardly directed. An annular diametrically expansible upper mounting flange 133 of elastic, resiliently flexible and compressible material, such as rubber, is secured to the plates 130 within the angle formed by the portions of the plates and in circumscribing relation to the column outwardly of the outer guide posts 117. The mounting flange 133 is adapted for diametric expansion from an inner relaxed position, as illustrated in Fig. 5, to an outer diametrically enlarged position, as illustrated in Fig. 6, in marginally overlapped air-tight engagement with the uppermost bead 91 of a tire 90 mounted on the rim 105 and the annular wall 106, all in a manner similar to that described with the tongue portion 70.

As explained in relation to the segment plates 75, the ends of the plates 130 are spaced when the mounting flange 133 is outwardly expanded. To reinforce the expansible mounting flange 133 intermediate the ends 131 of the plates 130, longitudinally and transversely arcuate slide plates 134 are fitted between said flange and the plates 130. As before, one end of each slide plate is preferably affixed to an adjacent end of a plate 130 as by spot welding at 135. The other end of each slide plate is slidably engaged with its opposite adjacent plate 130.

For controlling the expansion and contraction of the mounting flange 133, a pneumatic ram 140 is mounted on the plate 101 within the column 100 by means of bolts 141, and air hoses 142 are connected to the ram and to a source of air under pressure, not shown. The ram includes a plunger 143 axially slidably extended through the mounting plate upwardly therefrom, and a cam 144 is concentrically integrally connected to the plunger. The cam provides an upwardly divergently extended frusto-conical surface 146 in engagement with the inner end portions 122 of the arms 121. It is also to be noted that a valve stem 148 is screw-threadably connected in the air passage 110 in the annular wall 106 and is adapted for connection to an air supply in the same manner as the valve stem 80 in the air passage 43.

The operation of the second form of the invention is similar to the operation of the first form and is briefly summarized at this point. A tire 90 to be inflated is fitted over the rim 105 with the mounting flange 133 retracted, as seen in Fig. 5. The ram 140 is retracted to pull the plunger 143 and the cam 144 axially downwardly toward the ram. This urges the arms 121 radially outwardly of the guide posts 117 and ring 118 to expand the mounting flange 133 into its outer position, as viewed in Fig. 6. This holds the tire on the rim and seals the upper bead 91 thereto. Thereafter, air is admitted to the tire through the valve stem 148 for inflation of the tire. To remove the tire, the ram is extended whereby the resilience of the mounting flange urges the arms radially inwardly of the guide posts and ring. This inward movement of the arms is permitted, of course, because of the upward movement of the cam surface 146. The springs 126 are provided for facilitating and insuring radial inward movement of the arms incident to retraction of the ram.

From the foregoing, it will be evident that a highly useful apparatus has been provided for mounting a tire in predetermined position and for enabling inflation of the tire in such position. The invention provides a rim adapted for releasably quickly receiving and releasing a tire and for maintaining the tire in air-tight engagement therewith whereby the tire may be easily inflated. Although the apparatus has been described for use in connection with the post-inflation of a tubeless tire subsequent to recapping thereof, it is to be understood that it has other utility, such as for example the detection of air leaks in a tire dunking apparatus and also as a holder for a tire during buffing or other tire servicing operations.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tire chuck comprising a substantially cylindrical rim concentric to an axis therefor and having an outwardly disposed surface, first and second flanges mounted on the rim in spaced relation axially of the rim and extended outwardly away from said axis, the first flange being extended outwardly from the rim, the second flange being elastic and being contractible and expansible radially inwardly and outwardly with respect to the rim between an outer position extended outwardly from the rim and presenting a continuous wall surface in opposed relation to the first flange and a position retracted inwardly from said outer position, the rim and the flanges providing a substantially air-tight tire-holding channel when the second flange is in said outer position, means operably associated with said second flange for moving the second flange between said inner and outer positions, and means connected to the rim for supplying air under pressure to said tire holding channel.

2. A tire chuck comprising a substantially cylindrical rim of predetermined diameter having a concentric axis of reference and having an outer surface, an annular flange rigid with the rim and outwardly extended with respect to the axis therefrom, an elastic annular flange of resiliently flexible and compressible material radially expansible to a diameter greater than that of the rim and radially contractible under its own elasticity to a diameter approximately that of the rim, means mounting the expansible flange on the rim in air-tight engagement therewith in axially spaced relation to the rigid flange, controlled means operably associated with the expansible flange for expanding the expansible flange to an outer position in opposed spaced relation to the rigid flange presenting a continuous air-tight barrier in spaced relation to the inner flange whereby a tire can be retained on the rim between the flanges and for releasing the expansible flange for contraction under its own elasticity to allow passage of a tire thereover onto and off of the rim, and means providing an air passage into the interior of a tire positioned on the rim for supplying air under pressure to the tire to expand the tire into substantially air-tight engagement with the flanges.

3. The tire chuck of claim 2 in which the expansible flange is provided with arcuate reinforcing plates of wear-resistant material mounted on the side of said expansible flange opposite to the rigid flange and slidably engaged against the expansible flange mounting means.

4. In an apparatus for mounting a tire having opposed spaced annular beads, a rim including a central annular wall having a substantially cylindrical outer surface, the rim being substantially concentric to a predetermined axis and being adapted to be circumscribed by such a tire with the beads being slidably engageable with the wall, an annular tire receiving flange radially outwardly extended from the wall in air-tight association therewith, an elastic radially expansible tire mounting flange providing a continuous annular air-tight barrier mounted on the wall for diametric expansion radially of said axis between a position radially outwardly extended from and in substantially air-tight contact with the wall in opposed axially spaced relation to the receiving flange and to retract under its own elasticity to enable mounting the tire on the wall and releasing it therefrom, powered means connected to the expansible flange for expanding the expansible flange to its outwardly extended position, and means connected to the rim for supplying air under pressure therethrough to the interior of the tire to slide the beads axially of the rim into air-tight engagement with the flanges.

5. A tire chuck comprising an annular rim concentric to an axis therefor and having an outwardly disposed surface; first and second flanges mounted on the rim in substantially air-tight association therewith in spaced relation axially of the rim, the first flange being extended outwardly from the rim, the second flange being elastic, being contractible radially inwardly under its own elasticity and being expansible outwardly to an outer position extended outwardly from the rim presentinng a continuous air-tight barrier in spaced opposing relation to said first flange, the rim and the flanges when the second flange is in outer position providing a substantially air-tight tire-holding channel; and means operably associated with said second flange for expanding said second flange to its outer position and releasing said second flange for contraction under its own elasticity to its inner position.

6. A tire chuck comprising an annular rim concentric to an axis therefor and having an outwardly disposed surface; first and second flanges mounted on the rim in substantially air-tight association therewith in spaced relation axially of the rim, the first flange being extended outwardly from the rim, the second flange having inner and outer diameters, being elastic, being contractible radially inwardly under its own elasticity and being expansible outwardly to an outer position extended outwardly from the rim presenting a continuous air-tight barrier in spaced opposing relation to said first flange, the rim and the flanges when the second flange is in outer position providing a substantially air-tight tire-holding channel; means operably associated with said second flange for expanding the inner and outer diameters of said second flange to its outer position and releasing said second flange for contraction of said inner and outer diameters under its own elasticity to its inner position; and means connected to the rim for supplying air under pressure to said tire-holding channel.

7. The apparatus of claim 5 wherein the rim provides an internal annular air chamber circumscribing said axis and an annular slot extended from the chamber radially outwardly through the wall; wherein the expansible second flange is mounted in the chamber and extended outwardly through the slot so as to be yieldably expansible outwardly in the slot into said outwardly extended position by pressure exerted outwardly from the chamber and said expansible flange being inherently contractible inwardly of the slot and into said inwardly retracted position upon release of such pressure; and including means connected to the rim in communication with the chamber for the controlled admitting and releasing of air into and from the chamber.

8. The apparatus of claim 7 including annularly arranged arcuate plates disposed in the slot having spaced adjacent ends and being individually connected to the expansible flange in substantially concentric circumscribing relation to said axis on the opposite side of the expansible flange from the first flange and in slidable engagement with a portion of the wall at a side of the slot.

9. In the apparatus of claim 5, a plurality of guides mounted on the rim radially inwardly of the second flange and in annular arrangement about said axis; said expanding means including a plurality of arms radially slidably outwardly extended through the guides having outer ends adapted to apply radially outwardly directed pressure on the second flange at positions in circumferentially spaced relation therearound and inner ends adjacent to the axis of the rim; a support mounting the rim thereon; and powered camming means mounted on the support in engagement with the inner ends of the arms and movable substantially axially of the rim for sliding the arms radially outwardly of the guides to move the second flange to said outwardly extended position and to release the arms for elastic contraction of said second flange.

10. In the apparatus of claim 5, a plurality of guides mounted on the rim radially inwardly of the mounting flange and in annular arrangement concentrically about said axis, said pressure applying means including a plurality of arms radially slidably outwardly extended through the guides having outer ends individually connected to the second flange at positions in circumferentially spaced relation therearound and inner ends adjacent to the axis of the rim, a support mounting the rim thereon, powered camming means mounted on the support in engagement with the inner ends of the arms and movable substantially axially of the rim for sliding the arms radially outwardly of the guides to move the second flange to said outwardly extended position and to release the arms for elastic contraction of said second flange, the second flange being substantially circular in cross-section, and longitudinally arcuate transversely angular plates having opposite ends and being connected in fitted relation to the mounting flange arranged in circumscribing relation to said axis and with adjacent plates in endwardly spaced relation to each other, the outer ends of the arms being individually engaged with the plates.

11. In an apparatus for mounting a tire having spaced annular beads, a support; a rim borne by the support having an annular wall circumscribing a predetermined axis and providing an annular air chamber inwardly of the wall concentrically circumscribing the axis, the wall providing a circumscribing slot in communication with the chamber, a tire receiving flange rigidly substantially radially outwardly extended from the wall in spaced relation axially of the wall from the slot, the rim being adapted to receive such a tire in circumscribing engagement with the wall and with one of the beads engageable with said receiving flange, a diametrically expansible annular elastic tire mounting flange constituting a continuous air-tight barrier having predetermined axially disposed inner and outer surfaces, an inner head portion fitted in the chamber and an outer tongue portion slidably outwardly extended through the slot, the elastic flange being slidably movable in the chamber and the slot substantially radially of such axis between an outer expanded position with the tongue portion in opposed axially spaced relation to the receiving flange and in marginally overlapped air-tight engagement with the wall and the bead of the tire opposite to the bead engageable with the receiving flange, and an inner elastically self-retracted position with the tongue portion withdrawn into the slot out of said opposed relation to permit mounting the tire on the rim and releasing the tire therefrom, a plurality of endwardly spaced arcuate plates indivdually secured to the outer surface of the elastic flange in circumscribing relation to the axis for slidable engagement with the wall during said radial movement of the elastic flange, and means connected to the rim for admitting air into the chamber to expand the elastic flange and for releasing air from the chamber to allow such flange elastically to contract.

References Cited in the file of this patent

UNITED STATES PATENTS

| | | |
|---|---|---|
| 1,619,102 | Desautels | Mar. 1, 1927 |
| 2,024,941 | Miller | Dec. 17, 1935 |
| 2,045,937 | Woock | June 30, 1936 |
| 2,145,806 | Schnedarek | Jan. 31, 1939 |
| 2,371,586 | Schwartz | Mar. 13, 1945 |
| 2,475,732 | Yeo | July 12, 1949 |
| 2,822,020 | Heffner | Feb. 4, 1958 |

FOREIGN PATENTS

| | | |
|---|---|---|
| 108,934 | Great Britain | Aug. 30, 1917 |